Figure 1:
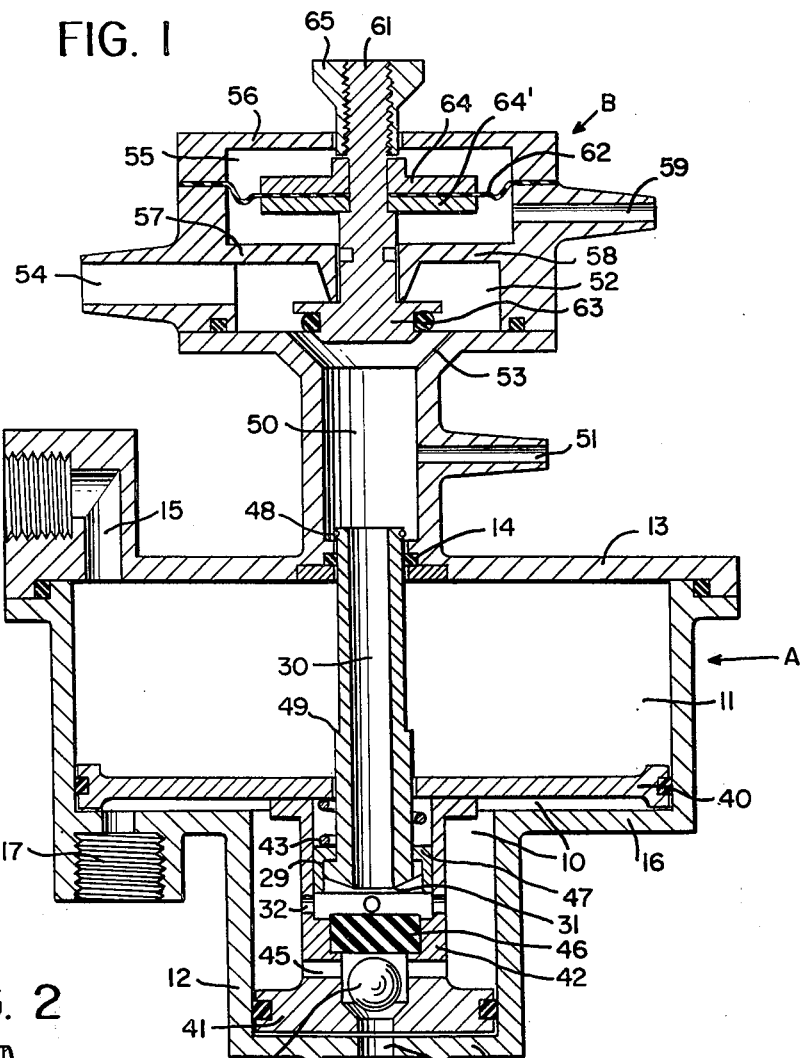

United States Patent [19]
Bron

[11] 3,971,341
[45] July 27, 1976

[54] AUTOMATIC PROPORTIONER FOR LOW-PRESSURE WATERING TROUGHS

[76] Inventor: Dan Bron, 36 Palmach St., Romema, Haifa, Israel

[22] Filed: Dec. 13, 1974

[21] Appl. No.: 532,408

[30] Foreign Application Priority Data
Dec. 18, 1973 Israel.................................... 43855

[52] U.S. Cl.................................. 119/72; 137/99; 417/377
[51] Int. Cl.² ..................... G05D 11/03; A01K 7/02
[58] Field of Search...................... 137/99; 417/377; 119/51.5, 72, 78, 79, 80

[56] References Cited
UNITED STATES PATENTS

| | | | |
|---|---|---|---|
| 3,150,639 | 9/1964 | Sereda................................. | 119/78 |
| 3,228,560 | 1/1966 | Tacchi............................ | 417/377 X |
| 3,818,924 | 6/1974 | Carlyle................................ | 137/99 |

*Primary Examiner*—Robert G. Nilson
*Attorney, Agent, or Firm*—Levonna Herzog

[57] ABSTRACT

An automatic proportioner for supplying medication to automatic watering troughs in poultry yards, comprises a differential piston unit movable in a stepped casing with the small piston acting as pump and the larger piston as actuator. A tubular valve movable coaxially with the piston unit serves to admit line water under pressure into the intermediate cylinder space for the upward stroke, whereby a concentrated medicated solution is sucked from a vessel into the suction side of the pump. During the downward stroke the valve interrupts the water supply from the line and the large piston is driven in downward direction by water from a raised storage tank, whereby the solution is driven into the intermediate space, mixed with the line water remaining therein in the proportion of the respective cylinder volumes and expelled to the troughs, at a pressure defined by the water level in the raised storage tank. A pressure-operated valve closes the line water supply as soon as the medication vessel is empty and stops the proportioner. A second pressure-operated valve opens a direct connection between the storage vessel and the watering troughs should the line water supply fail.

4 Claims, 3 Drawing Figures

AUTOMATIC PROPORTIONER FOR LOW-PRESSURE WATERING TROUGHS

Drinking water for domestic fowl is generally supplied by means of automatic watering troughs which are kept at a certain level by a float — or weight — controlled valve. Their main object is to prevent waste of water, avoid its spilling on the floor and to avoid pollution by the animals themselves. For treatment against diseases certain drugs, antibiotics, vitamins etc. are added to the water from time to time, and in order to be effective they have to be accurately proportioned.

Medication of water is mostly carried out manually by the farmer in that he fills the storage tank serving the automatic drinking troughs, with an exactly proportioned quantity of medicated water. In order not to dilute the solution no fresh water is allowed to flow into the tank, until all medicated water has been consumed. The drawback of this method is that the farmer must be aware of the moment the tank becomes empty, so as to fill it with fresh water, otherwise the animals might perish.

On the other hand, automatic proportioners are available for insertion into a pressure line, however they are unsuitable for areas where water supply is interrupted frequently and the farmer has to rely on low-level storage tanks which supply the water to the troughs at low pressure.

The object of the present invention, accordingly, is to provide a medicator-proportioner which gives accurate dosing from nil to a maximum capacity of water delivered. A further object of the invention is to supply a proportioner which will automatically renew the flow of fresh water from a storage tank to the troughs, as soon as the tank containing medicated solution has been emptied, or whenever the main water supply is interrupted.

Still another object is to provide a proportioner that requires no electric or other energy supply except for a fresh water supply under pressure.

The proportioner is designed to operate in a system comprising automatic valve-operated watering troughs supplied with water under relatively low pressure from a raised storage tank. It consists essentially of a piston pump designed for drawing, with every stroke, a fixed quantity of medicated water solution out of a container, mixing it with a larger fixed quantity of fresh water and delivering the mixture to the watering troughs, while the direct supply from the tank is interrupted. The reciprocating motion of the pump piston is obtained from a hydraulic linear actuator enclosed in a common casing with, and connected to, the pump piston by a tubular piston spacer, the actuator being driven in the direction defined by the suction stroke of the pump by water from a central water supply under pressure which is made to enter a so-called "mixing space" enclosed between the two pistons and the casing walls.

Water enters the mixing space through holes in the spacer interior which latter is connected to the outside by means of a tube valve slidingly arranged in the spacer and extending to the outside of the casing through a shaft seal in the actuator cover into a space receiving water under pressure. The tube valve has a limited axial movement in the spacer, being closed by contact with a seat at the bottom of the latter, and is provided with outwardly extending projections that are adapted to engage with stops on the casing cover in such a manner that the valve is opened at the end of the return stroke and closed at the end of the suction stroke, its open or closed state during the respective stroke being maintained by differential water pressure acting on its end faces.

The return stroke is induced by pressure from the raised tank connected to the side of the actuator piston remote from the mixing space, whereby the solution raised by the pump is driven into the said mixing space and expelled out of it together with the water that had entered during the suction stroke, by the returning actuator, into a line supplying the watering troughs. The pumping action continues as long as water is consumed from the troughs and is interrupted as soon as the trough valves close the line.

Means are provided for safeguarding the supply of fresh water from the raised storage tank in case the solution container is empty or the central water supply is interrupted. This purpose is served by a diaphragm-operated stem valve that is designed to close the water supply to the end of the tube valve by a vacuum acting on the diaphragm. This vacuum is created by means of a float arranged to close a suction tube reaching from the pump into the medicated water container, at low level, through a pipe connection between the said suction tube and the diaphragm housing. Simultaneously the stem valve closes the access of water pressure to a pressure-operated valve placed into the line supplying the troughs from the storage tank, which pressure-operated valve is designed to close the line by pressure acting on it.

In a preferred embodiment of the invention the stem valve can be manually opened by means of its stem extending to the outside of the casing.

In another preferred embodiment of the invention the pressure-operated valve inserted into the line leading from the storage tank to the watering troughs is a diaphragm valve provided with four ports for connection to the storage tank and the actuator cylinder on one side, and to the mixing space and the troughs on the other side of the closure.

Figure 2:
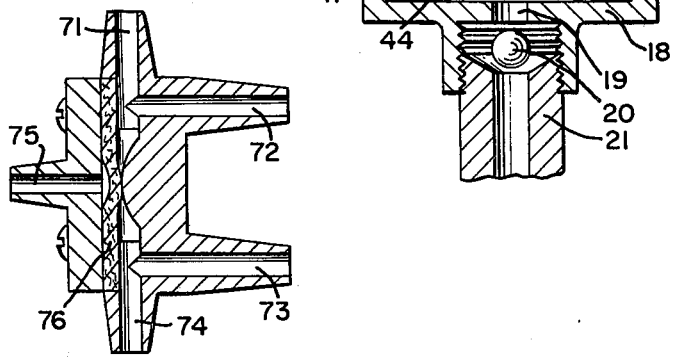
Figure 3:
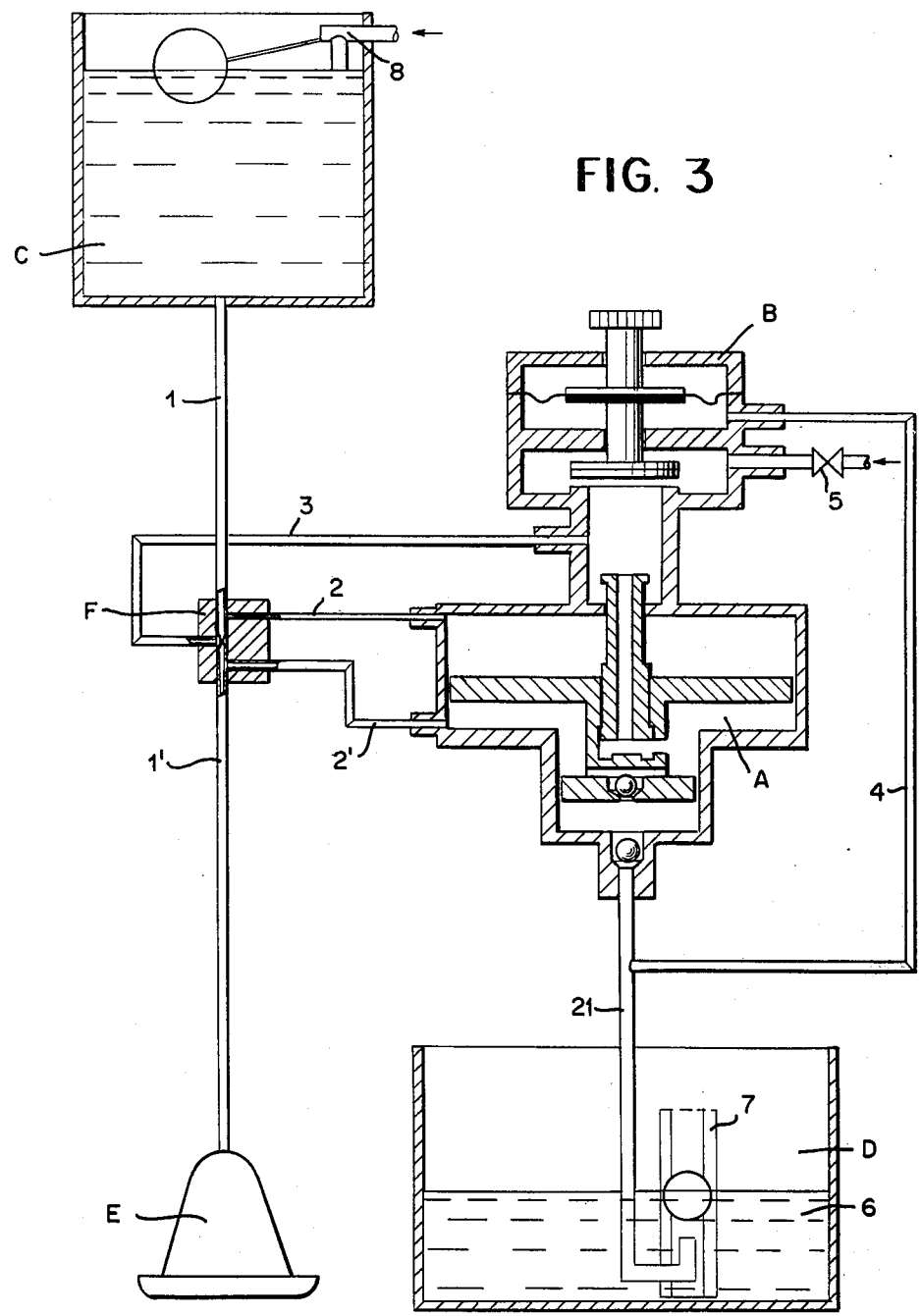

In the accompanying drawings which illustrate, by way of example, one embodiment of the invention, FIG. 1 is a cross section through a proportioner unit, FIG. 2 is a cross section through a diaphragm valve, to be installed in the line leading from the storage tank to the watering troughs, and FIG. 3 shows a schematic arrangement of a watering and medicating installation by incorporating the proportioner and the diaphragm valve as per FIGS. 1 and 2.

FIG. 1 is a cross section through an actually produced proportioner and shows details of the several parts used to assemble the casing, the piston unit and the valve unit. However, not always will reference be made to each of the several components making up one integral part, if this design is the result of ease of manufacture and assembly. The proportioner as shown in FIG. 1 comprises two distinct operational units which, for sake of convenience only, are housed in one casing, but could easily be separated and connected by a pipe or hose. They are the pumping and proportioning unit A and the operation-control unit B. Unit A is placed in a closed housing which comprises an actuator cylinder 11 of larger diameter and a pump cylinder 12 of a smaller diameter, the ratio of the cylinder areas being the ratio of fresh water to medicated solution which in the present Figure would be in the range of 10 to 1. The actuator cylinder possesses a flat end cover 13 which is provided with a shaft seal 14 for the passage of a sliding valve tube 30, and a pipe-threaded opening 15 to be connected by a pipe to a raised water tank. The opposite cover 16 is flat and annular and merges with the pump cylinder 12. It possesses a similar pipe-threaded opening 17 which is to be connected to the watering troughs. A flat pump cylinder cover 18 possesses in its centre a suction opening 19, a suction valve 20 and a suction tube 21. The space enclosed between the two pistons and the cylinder walls and cylinder cover 16 forms the so-called mixing space 10. The piston unit comprises a large disc-shaped actuator piston 40 and a smaller pump piston 41, which are connected by a tubular spacer 42 in spaced relationship so that in their lowest position they lie close to the cylinder covers 16 and 18 respectively. A ball-type delivery valve 44 is provided in the pump piston the interior of which is connected to the mixing space through delivery ports 45 in the tubular spacer 42. In the bottom part of the spacer concentrically therewith a disc 46 of a resilient material is inserted into a suitable recess, and serves, on the one hand, as a stop for the ball of the delivery valve 44 and, on the other hand, as a seat for the ring-shaped end 31 of a sliding valve tube 30. The valve tube projects with its upper portion out of the actuator cylinder and is guided in a shaft seal 14 fixed in the actuator cover 13. Its lower portion enters the tubular spacer and is guided therein by means of an intermediate sleeve 47 that engages the valve tube by means of corresponding shoulders 29 on both parts. The sleeve 47, together with the valve tube is pressed, through the said shoulders, in the direction of the resilient seat 46 by a weak helical spring 43, its force being balanced by the water pressure acting on the annular end faces of both parts. The end of the tubular spacer 42 is hydraulically connected to the mixing space 10 by radial openings 32 which can be closed by the sleeve 47 in its downward position. The movement of the valve tube is limited at its upper end by an inserted ring 48 outside the shaft seal, and by a shoulder 49 adapted to abut against the inside of the cylinder cover 13.

The operation-control unit B is rigidly and co-axially connected to the cylinder cover 13 and comprises three concentric chambers each of which is provided with a nipple for attachment of a pipe or hose. Starting from the actuator a first tubular chamber 50 is designed to a length permitting the outward movement of the tube valve 30, and is provided with a tube nipple 51, for connection to the diaphragm valve.

It is separated from the next chamber 52 by a conical valve seat 53. This chamber has in its side wall a nipple 54 for connecting it to a central water supply line. The last chamber 55 possesses a flat cover 56 which is centrally perforated for penetration of a valve stem 61 while it is separated from the chamber 52 by a partition wall 57 which is centrally perforated and provided with a shaft seal 58, also for the said valve stem 61. It is divided into two cylindrical spaces by a co-axial resilient diaphragm 62, the lower of these spaces having a pipe nipple 59 for connecting it to a branch off the suction tube 21.

A stem valve 63 of a size to fit the conical valve seat 53 serves to interrupt the connection between the chambers 50 and 52, upon actuation by the diaphragm 62. It is fixed to the centre of this diaphragm by two discs 64 and 64' clamping the latter between their surfaces with the aid of an external knob 65 which is screwed onto the threaded end of the valve stem.

The four-way valve shown in FIG. 2 possesses four ports and hose nipples 71, 72, 73 and 74 destined to transmit a liquid, and a fifth nipple 75 serving to transmit pressure to a diaphragm 76. The diaphragm is so placed as to interrupt — upon pressure being applied to it through the nipple 75 — the link between the ports 71 and 72 on one side and the ports 73 and 74 on the other, allowing the continuous flow between 71 and 72, as well as between 73 and 74. Its function will be fully explained in conjunction with FIG. 3.

The complete installation of a medicator-proportioner in a low-pressure system is shown in FIG. 3.

Herein A is the proportioner, B the operation-control unit, C a fresh-water tank raised to at least 2 met. above ground level, D a medicated solution tank below the level of the proportioner, E is one of a number of automatic valve-operated watering troughs and F is the four-way valve illustrated in FIG. 2. These units are interconnected by pipes or hoses as follows:- From the fresh-water tank C a pipe 1, 1' leads to the troughs via the ports 71 and 74 of the four-way valve F, through which ordinarily water is supplied as long as this valve is in open state. The ports 72 and 73 are connected by tubes 2 and 2' to the two openings 15 and 17 in the actuator cylinder, allowing water to flow from the tank to the actuator and from the mixing space to the troughs as long as the valve F is closed by the diaphragm 76. In fact, these connections are permanently open, however as long as the pump does not operate no water or solution can flow through. The pressure space of the diaphragm is connected through a pipe 3 to the nipple 51 of the operation-control. Finally there is a connecting tube 4 between the suction chamber 55 and the suction tube 21, and an outside water supply under pressure is connected to chamber 52, to be closed by a cock 5. The end of the suction pipe 21 is bent by 180° to point upwards and is adapted to be closed by a ball float 6 guided in a vertical cage 7.

The installation operates as follows:- Under normal working conditions the tank C is kept full of fresh water by a float valve 8. It is sized so as to keep a sufficient reserve should the central supply be interrupted for a few hours. As long as the four-way valve is open the watering troughs E are supplied through lines 1 and 1'. Whenever necessary the farmer fills the solution tank D with a mixture of medicine in water, opens the cock 5 and pulls the knob 65 of the operating control B. Hereby water under pressure flows into the chamber 50 and from here through the tube valve 30 and the openings 32 into the mixing chamber 10 of the proportioner on the one hand and to the diaphragm of valve F on the other hand, closing it and preventing fresh water from reaching the troughs. The water pressure raises the actuator piston and solution is raised out of the tank D, filling the suction space of the pump. While the pistons move upwards they are followed by the tube valve 30 and the sleeve valve 47 owing to the water pressure acting on their annular end surfaces, until the shoulder 49 comes in contact with the cover 13. This stops the valves while the pistons continue to move, until the sleeve 47 covers the openings 32, and immediately afterwards the end 31 of the valve tube 30 comes in contact with the valve seat 46, closing all access of water to the mixing space. When there is demand for water at the watering troughs the contents of the mixing chamber flow out and the pressure is relieved. The pressure from the storage tank is now sufficient to drive the actuator piston in downward direction whereby the medicated solution is driven out of the pump cylinder into the mixing space intermixing with fresh water, and this mixture now leaves through the opening 17 and through the diaphragm valve F to the troughs E. The operation is repeated as long as drinking water is required. The downward movement of the pistons is not necessarily continuous, and its speed and frequency are dictated by the quantity of water consumed or evaporated.

As soon as all of the solution is pumped out of the container D the float 6 closes the suction tube 21 and continuing pumping action of the piston results in a vacuum, in the tube which is transmitted to the diaphragm 62 of the operation control unit. This vacuum now closes the valve 63 and pressure is cut off from both the actuator and the diaphragm valve. Thereupon the actuator stops moving, and the valve F opens the direct connection between the storage tank and the troughs. The same effect will be obtained by interruption of the central water supply connected at 54.

The proportioner is designed that the mixing space is never completely emptied and that a certain quantity of mixed liquid is retained in the space between the tubular spacer and the pump-cylinder walls.

In the foregoing the proportioner has been shown with its axis vertical, however the operation is equally efficient with the axis in horizontal direction.

Instead of the four-way valve a standard stop valve actuated by a pressure-sensitive element may be installed in the line running from the storage tank to the watering troughs. In this case there will be a permanent pipe connection between the mixing space and the line feeding the troughs, and another line connecting the storage tank with the top of the actuator cylinder. This arrangement would not alter the operation of the unit, since by installing the four-way valve these connections are permanently open whether the diaphragm opens or closes the valve.

It is also proposed that, in certain cases, the rigid pistons be replaced by resilient diaphragms, similarly connected by a rigid spacer and circumferentially clamped to the casing walls, the valve arrangement being the same as hereinbefore described. However this embodiment will not allow very exact dosing of the solution, due to the unequal expansion of the diaphragms.

I claim:

1. A proportioner designed to supply a medicated solution to automatic watering troughs comprising a piston pump and a hydraulic piston actuator of larger diameter, both linearly movable in a stepped cylinder casing, with their pistons rigidly held in spaced relationship by a tubular spacer which is provided, in proximity of the pump piston, with openings in its wall, and which contains slidingly arranged in its interior a tube valve reaching at its one end to the outside of the casing through a sealing element and closing with its other end, in its innermost position in the said spacer, a valve seat, the tube valve being further provided with outwardly extending projections adapted to engage with corresponding stops in the casing for opening or closing the valve seat, the pump being provided with a suction valve in the cylinder, with a delivery valve in its piston and with ports leading from the delivery valve to the mixing space formed by the inner faces of the two pistons and the spacer on the one hand and by the casing walls on the other hand; the suction stroke of the pump being induced by water under pressure entering the mixing space from the outside through the open tube valve and the openings in the spacer and driving the actuator piston in a direction away from the pump cylinder, while the return stroke is induced, after closing of the tube valve, by water from a raised tank acting on the outer face of the actuator piston and thereby driving the mixture of medicated solution entering the said space through the delivery valve and the water previously contained in this space to the watering troughs through a suitable connection.

2. A proportioner as claimed in claim 1 wherein the projections on the tube valve engage stops on the actuator cover in such a manner that the valve seat is closed at the end of the suction stroke and is opened at the end of the return stroke, the end faces of the tube valve being so dimensioned that it is held in closed or open state during the suction and return stroke respectively by differential water pressure acting on the end faces.

3. A tube valve as claimed in claim 2 wherein a sleeve is slidingly arranged between the valve and the spacer interior projecting beyond the end of the valve, engaging with it by mutual shoulders and biased against these shoulders by spring means, this sleeve being adapted to close the openings in the spacer wall at the end of the suction stroke, before the valve seat is closed by the tubular valve.

4. A system for supplying medicated water in an exactly fixed proportion to watering troughs for domestic animals which comprises
   1. watering troughs of the type opening a water access valve when the water therein sinks below a predetermined level,
   2. a raised water storage tank connected to the troughs by a supply line,
   3. a pressure-operated valve inserted into the said supply line and adapted to close it upon pressure from a central water supply acting on its pressure sensitive mechanism,
   4. a container for a concentrated solution of a medicament in water placed at a low level,
   5. a mechanical reciprocating proportioner as claimed in claim 1 having its pump portion at a level above the solution container and having a first connection between the actuator mixing space and the watering troughs and a second connection between its other end and the raised water storage tank,
   6. a suction tube connecting the piston pump with the solution container and provided with a float adapted to close the suction tube at a low level of solution,
   7. a diaphragm-operated valve in a housing having a first connection to a central water supply and a second connection to the end of the tube valve of the said proportioner, adapted to interrupt the passage of water to the proportioner upon a vacuum acting on the diaphragm, which vacuum is created by the closing of the suction tube by the said float and transmitted by a line reaching from the suction tube to an enclosed space in the valve housing one side of which is formed by the said diaphragm, and
   8. a line connecting the second connection of the housing of the diaphragm-operated valve to the pressure-sensitive mechanism of the pressure-operated valve in the line from the storage tank to the watering troughs.

* * * * *